United States Patent [19]

Wilson

[11] Patent Number: 4,905,792
[45] Date of Patent: Mar. 6, 1990

[54] DEER STAND WITH IMPROVED TREE FASTENING MEANS

[76] Inventor: Edward L. Wilson, 252 Lower Woodville Rd., Natchez, Miss. 39270

[21] Appl. No.: 326,098

[22] Filed: Mar. 20, 1989

[51] Int. Cl.⁴ ............................................. A01M 31/02
[52] U.S. Cl. ..................................... 182/187; 182/116; 182/178
[58] Field of Search ................. 182/187, 188, 133–136, 182/115, 116, 178; 248/219.1, 219.4, 218.4

[56] References Cited

U.S. PATENT DOCUMENTS

| | | | |
|---|---|---|---|
| 575,857 | 1/1897 | Sly | 182/187 X |
| 1,408,900 | 3/1922 | Miller et al. | 248/231 |
| 1,952,863 | 3/1934 | Halker | 248/231 |
| 3,493,080 | 2/1970 | Ghlert et al. | 182/187 |
| 3,871,038 | 3/1975 | Triuett | 248/231 X |
| 4,257,490 | 3/1981 | Bandy | 182/187 X |
| 4,552,247 | 11/1985 | Purdy | 182/187 X |
| 4,579,198 | 4/1986 | Lee | 182/187 X |
| 4,730,669 | 3/1928 | Threllkeld | 182/187 |
| 4,819,763 | 4/1989 | Grote | 182/187 |

Primary Examiner—Alvin C. Chin-Shue
Attorney, Agent, or Firm—Hill, Van Santen, Steadman & Simpson

[57] ABSTRACT

An improved tree fastener for a deer stand has adjustable tree clamping purchase provided by a pair of fork members forming a V-shaped throat for engaging the trunk of an adjacent tree and a continuously adjustable bolt and nut hooked into a tightening relation with a flexible band such as a link chain. The fastener is mounted on the seat module of a light weight modular ladder assembly of sufficient portability to be readily carried into a wooded hunting locale.

4 Claims, 1 Drawing Sheet

U.S. Patent  Mar. 6, 1990  4,905,792
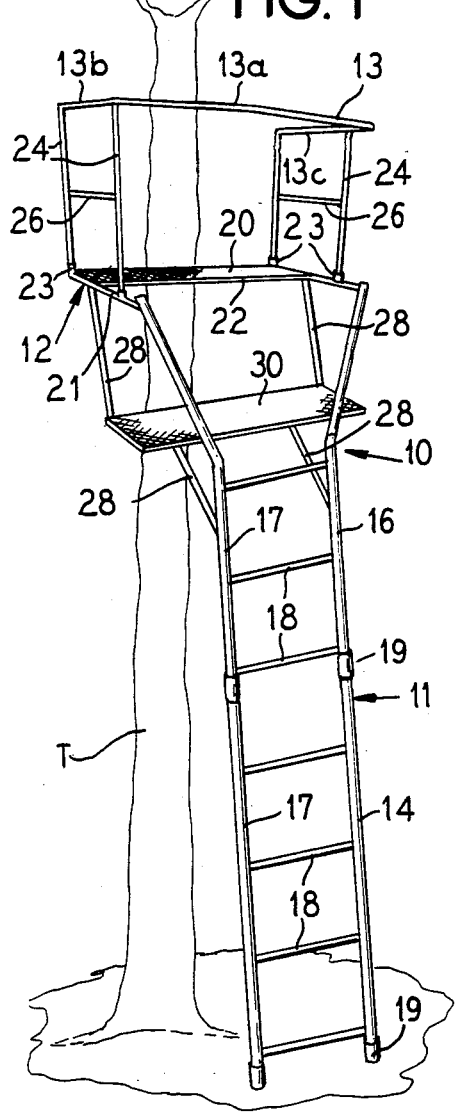
FIG. 1
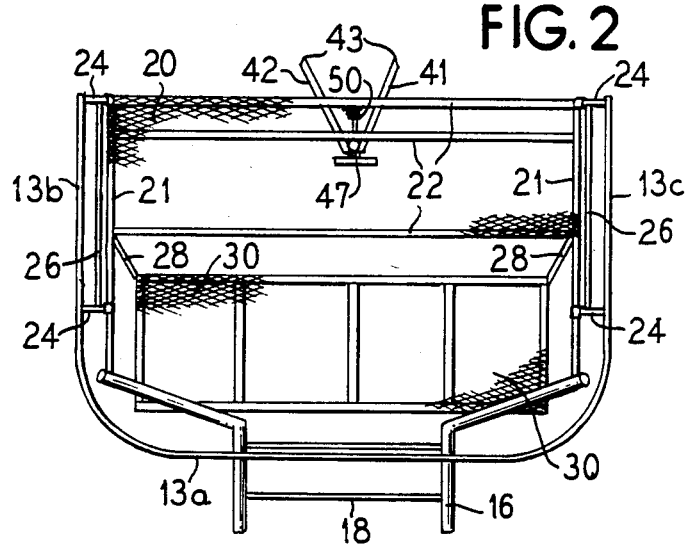
FIG. 2
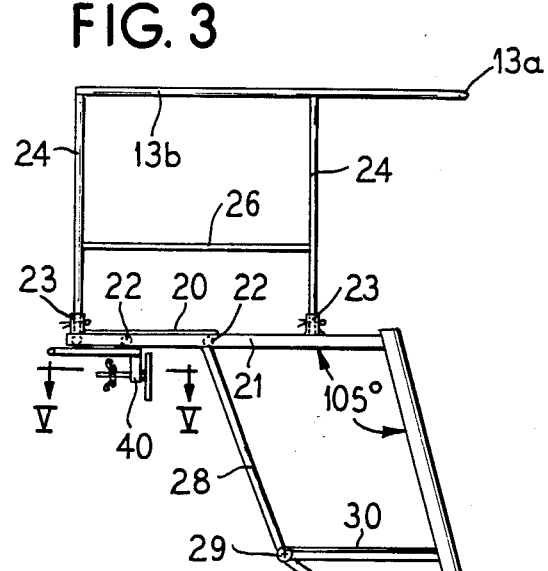
FIG. 3
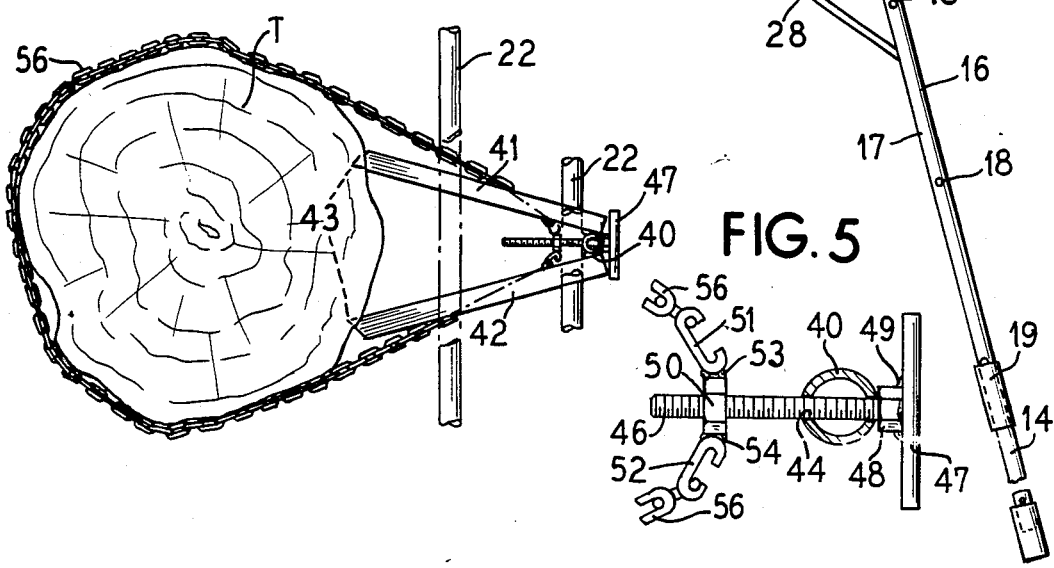
FIG. 4
FIG. 5

4,905,792

DEER STAND WITH IMPROVED TREE FASTENING MEANS

BACKGROUND OF THE INVENTION

1. Field of the Invention

This invention relates generally to deer stands utilized by hunters and sportsmen and more particularly to an improved tree fastening means therefor.

2. Description of the Prior Art

Various stands have been provided heretofore which comprise ladders or step forming means surmounted by a platform or a seat so the hunter may achieve an elevated vantage point in the hunt area.

Such devices are frequently simply leaned against a supporting tree with consequent instability and risk of physical injury to the user.

SUMMARY OF THE INVENTION

By the present invention a special and very effective fastener for a deer stand is provided wherein a clamping purchase is obtained between a rigid fork and a flexible chain or cable connected to a continuously adjustable bolt. The user may quickly and conveniently set up the stand, wrap the chain around the adjacent tree and selectively tighten the purchase by turning a handle provided on the bolt.

BRIEF DESCRIPTION OF THE DRAWINGS

FIG. 1 is a perspective view of a tree stand embodying the principles of my invention;

FIG. 2 is a plan elevational view of the tree stand of FIG. 1;

FIG. 3 is a side elevational view of the tree stand of FIGS. 1 and 2;

FIG. 4 is an enlarged fragmentary plan view with parts broken away and with the tree shown in section of the improved fastening means of the present invention;

FIG. 5 is a fragmentary cross-sectional view taken on the plane of line V—V of FIG. 3 with parts rotated to show additional details of construction of the fastening means of the present invention.

DESCRIPTION OF THE PREFERRED EMBODIMENTS

The present invention finds a particularly appropriate application to a deer stand used by hunters and/or sportsmen in a wooded locale. Thus there is shown generally at 10 a deer stand comprising a ladder 11, a seat 12, and a top rail 13.

The ladder may take the form of one or more modules made of lightweight aluminum or any other suitable material. For example, as embodied in the exemplary disclosure, a five foot module 14 and a three foot module 16 are quickly and conveniently interconnected by telescoping coupling sleeves retained in a locking position by detent means. The individual modules comprise tubular side pieces 17 with rungs 18 extending therebetween and spaced apart from one another on fifteen inch centers. The couplings are shown at 19.

The ladder module 16 of th present invention has the seat 12 connected to it. If desired the seat structure may take the form shown in the drawings wherein the seat comprises a shelflike element which may comprise a sheet-form member made of expanded metal and shown at 20. The seat shelf 20 is supported by suitable framing including end tubes 21 and cross tubes 22.

Each of the end tubes 21 of the seat framing is provided with a tubular socket at spaced intervals in which to receive in a plug-in relation the upstanding stanchion tube of the top rail 13. In the illustrative embodiment of this invention there are two such sockets 23,23 on each end tube 21.

The top rail 13 is a tubular member bent or otherwise configured to form a curved U-shape with the bight portion 13a paralleling the seat shelf 20 and the respective end leg portions 13b and 13c paralleling the end tubes 21,21 of the seat framing. A pair of upright stanchion tubes 24,24 are disposed at opposite ends of the top rail 13 and are connected to corresponding end legs 13b or 13c at their top ends. The bottom ends of the stanchion tubes 24,24 are plugged into corresponding sockets 23 thereby to position the top rail at a selected spaced distance above the seat shelf 20. To further rigidify and support the top rail 13, a cross piece 26 extends between a medial portion of each pair of stanchion tubes 24,24. To prevent inadvertent removal of the stanchion tubes 24,24 from the sockets 23, suitable openings may be formed in the adjacent members to receive a locking pin such as a cotter pin 27 as shown in FIG. 3.

The construction of the seat 12 further includes a linkage by means of which the seat 12 is connected to the ladder 11. A plurality of links are shown at 28 and may be pin connected as at 29 to accommodate pivotal movement between a folded carrying position or transporting position and the extended utilitarian position of the drawings. An intermediate step 30 also made of expanded sheet-form metal is also part of the linkage.

In order to place the components of the deer stand 10 in operative position, the framing of the seat 12 including the end tubes 21 and the links 28 are positioned at approximately an angle of 105 degrees as shown in FIG. 3.

In accordance with the present invention, an improved tree fastener is provided for the deer stand 10. First of all, there is an upright support member or body member 40 which may advantageously take the form of a vertically disposed tube or cylinder connected to one of the cross tubes 22 of the seat framing.

A pair of fork members 41 and 42 are elongated elements connected at one end to the body member 40 and extending laterally away therefrom in a normal relation, i.e., at right angles to the body member 40. The fork members 41 and 42 diverge away from one another so that together with one another they form a V-shaped throat. As appears in FIG. 4, the free ends of the fork members 41 and 42 are cut, formed, or shaped to provide a pointed end 43 thereby to achieve a good solid contact with the trunk of an adjoining tree, such as the tree T shown in FIGS. 1 and 4. The fork members 41 and 42 are of sufficient length to extend laterally beyond the seat shelf 20 for unimpeded contact with the tree T.

Spaced vertically from the fork members 41 and 42, the body member 40 is formed with a through passage 44 which extends at right angles to the axis of the body member 40 and in parallel relation to the lateral disposition of the fork members 41 and 42.

A fork adjusting bolt 46 is extended through the passage 44. At one end thereof the bolt 46 has assembled in firm assembly therewith a bolt turning handle 47 and a stop 48. As shown in FIG. 5, the stop 48 may conveniently comprise a nut which is turned on the end of the bolt 46 and then welded fast thereto as well as to an actuating or turning handle 47 as at 49. The nut or stop 48 abuts against the body member 40 at the edges of the passage 44. The passage 44 is of sufficient size to permit the bolt to turn freely while constraining the bolt 46 against lateral displacement.

On the other side of the body member 40, a special hook fastener nut 50 is provided. The nut 50 is threaded on the bolt 46 and has formed thereon two oppositely extending hooks shown at 51 and 52. By way of illustration, but not by way of limitation, the hooks 51 and 52 may conveniently comprise spread chain links, i.e., links that have been opened to form a "C" shaped hook which is connected to the nut 50 by a weldment 53 or 54 respectively.

In order to firmly embrace the adjoining tree T, a flexible binding means is provided which in the illustrative embodiment of this disclosure comprises a link chain 56. The chain 56 is wrapped around the tree T and is drawn by hand so that one end of the chain 56, or perhaps more accurately, one side of the chain 56 is hooked to one of the hooks 51 or 52 while the other side or end of the chain 56 is hooked to the other hook. The bolt adjusting handle 47 is then selectively turned, thereby axially moving the nut 50 on the bolt 46.

By virtue of the arrangement thus provided, the user can obtain a clamping purchase on the tree T which can be selectively tightened with the throat of the fork members 41 and 42 engaging one side of the tree T and the chain 56 embracing and engaging the opposite side of the tree T.

In use, the deer stand 10 of the present invention is readily transported by hand into an appropriate wooded hunting locale. The ladder 11 is quickly extended by coupling the modules 14 and 16 together. The seat 12 is swung into position on its linkage 28 and the top rail 13 is inserted into the sockets 23 and pinned. By engaging the fork members 41 and 42 of the improved fastening means against the tree T with the points 43 penetrating the bark of the tree, the chain 56, or other flexible cable or strap used for the purpose is placed around the tree T and is hooked on the hooks 51 and 52 and tightened by turning the handle 47.

Although minor modifications might be suggested by those skilled in the art, it should be understood that I wish to embrace within the scope of the patent warranted hereon all such modifications as reasonably and properly come within my contribution to the art.

I CLAIM AS MY INVENTION:

1. In a deer stand, the improvement of a tree fastener comprising:

a vertically upright body member, a pair of fork members each connected at one end to said body member at an upper portion thereof and extending laterally in a normal relation to said body member and diverging with respect to one another to form a V-shaped throat in which to engage against the trunk of a tree, a fork adjusting bolt comprising a threaded shaft member, a nut threaded onto said bolt and being formed with oppositely extending link engaging hooks, a bolt turning handle connected to one end of said bolt, said body member having a through passage formed therethrough in spaced parallel relation to said fork members through which said bolt passes so that the handle is on one side of the body member and the nut is received on the bolt on the other side of the body member, a link chain having one of its links connected to one of said hooks and wrapped around an adjacent tree and having another of its links connected to the other of said hooks, whereby the handle may be selectively turned to successively tighten a clamping purchase of the fork members and the chain on the tree.

2. A deer stand comprising, a ladder, platform means at the top of the ladder, linkage means positioning and retaining said platform means at an obtuse angle of approximately 105 degrees with respect to said ladder, and a tree fastening means mounted on said platform means in a position to engage an adjoining tree and comprising, a vertically upright body member, a pair of fork members each connected at one end to said body member at an upper portion thereof and extending laterally in a normal relation to said body member and diverging with respect to one another to form a V-shaped throat in which to engage against the trunk of a tree, a fork adjusting bolt comprising a threaded shaft member, a nut threaded onto said bolt and being formed with oppositely extending link engaging hooks, a bolt turning handle connected to one end of said bolt, said body member having a through passage formed therethrough in spaced parallel relation to said fork members through which said bolt passes so that the handle is on one side of the body member and the nut is received on the bolt on the other side of the body member, a link chain having one of its links connected to one of said hooks and wrapped around an adjacent tree and having another of its links connected to the other of said hooks, whereby the handle may be selectively turned to successively tighten a clamping purchase of the fork members and the chain on the tree.

3. A deer stand comprising, a modular ladder assembly having a pair of ladder modules, coupling means joining said modules into an integrated unit, one of said modules having a seat assembly connected thereto by a folding linkage and having a seat shelf positioned when in extended position at an obtuse angle of approximately 105 degrees with respect to the ladder unit, and a fastener unit connected to the seat assembly comprising, a vertically upright body member, a pair of fork members each connected at one end to said body member at an upper portion thereof and extending laterally in a normal relation to said body member and diverging with respect to one another to form a V-shaped throat in which to engage against the trunk of a tree, a fork adjusting bolt comprising a threaded shaft member, a nut threaded onto said bolt and being formed with oppositely extending link engaging hooks, a bolt turning handle connected to one end of said bolt, said body member having a through passage formed therethrough in spaced parallel relation to said fork members through which said bolt passes so that the handle is on one side of the body member and the nut is received on the bolt on the other side of the body member, a link chain having one of its links connected to one of said hooks and wrapped around an adjacent tree and having another of its links connected to the other of said hooks, whereby the handle may be selectively turned to successively tighten a clamping purchase of the fork members and the chain on the tree.

4. A deer stand as defined in claim 3 and further characterized by a top rail, said top rail and said seat assembly having stanchion means and socket means to mount said top rail onto said seat assembly.

* * * * *